(12) United States Patent
Manneschi

(10) Patent No.: US 7,098,789 B2
(45) Date of Patent: Aug. 29, 2006

(54) DETECTOR OF NON-AUTHORIZED OBJECTS IN A ZONE HAVING PROTECTED ACCESS

(76) Inventor: Alessandro Manneschi, 15, Via XXV Aprile, I-52100 Arezzo (IT)

( * ) Notice: Subject to any disclaimer, the term of this patent is extended or adjusted under 35 U.S.C. 154(b) by 198 days.

(21) Appl. No.: 10/762,997

(22) Filed: Jan. 21, 2004

(65) Prior Publication Data
US 2005/0116825 A1 Jun. 2, 2005

(30) Foreign Application Priority Data
Oct. 2, 2003 (FR) .................................. 03 11575

(51) Int. Cl.
*G08B 13/24* (2006.01)
(52) U.S. Cl. .................. 340/551; 340/552; 340/693.6; 324/228; 324/326
(58) Field of Classification Search ................ 340/551, 340/552, 572.1, 572.8, 693.6, 657, 561; 324/228, 324/326, 217, 239
See application file for complete search history.

(56) References Cited

U.S. PATENT DOCUMENTS

| 4,146,231 | A | * | 3/1979 | Merkle et al. ............... 473/269 |
| 4,866,439 | A | * | 9/1989 | Kraus .......................... 340/945 |
| 6,702,984 | B1 | * | 3/2004 | Avnery ......................... 422/22 |
| 6,819,241 | B1 | * | 11/2004 | Turner et al. ................ 340/551 |
| 6,970,087 | B1 | * | 11/2005 | Stis .............................. 340/551 |

* cited by examiner

*Primary Examiner*—Anh V. La
(74) *Attorney, Agent, or Firm*—Blakely Sokoloff Taylor & Zafman

(57) ABSTRACT

A device for detecting a prohibited object in a zone with protected access includes a supporting base designed to receive a single foot wearing a shoe of an individual to be inspected. The device further includes a detector to detect a target material and a position-identifier suitable for imposing accurate positioning of the foot of the individual being inspected relative to the detector.

30 Claims, 7 Drawing Sheets

DETECTOR OF NON-AUTHORIZED OBJECTS IN A ZONE HAVING PROTECTED ACCESS

BACKGROUND OF THE INVENTION

1. Field of the Invention

The present invention relates to the field of detectors designed for detecting non-authorized objects in a zone having protected access.

The present invention applies in particular to detecting metal objects.

2. Description of Related Art

Nowadays it is found to be necessary to check with a very high degree of reliability for attempts at introducing or removing non-authorized objects into or from a sensitive zone.

When posed in this way, the problem covers a very wide range of situations, and in particular but in non-limiting manner, it covers detecting objects stolen from stores, businesses, or warehouses, and attempts at introducing dangerous objects into protected zones such as stores, schools, stations, and public or private organizations.

Numerous means have already been proposed for performing such detection.

In particular, numerous metal detectors have already been proposed.

Examples of known detectors, and in particular metal detectors are to be found in the following documents: FR-2 720 519, FR-2 775 350, FR-2 780 585, FR-2 694 098, FR-2 697 919, FR-2 698 178, FR-2 698 968, FR-2 608 286, FR-2 610 417, FR-2 607 937, FR-2 608 286, FR-2 607 937, U.S. Pat. No. 6,362,739, U.S. Pat. No. 6,359,582, U.S. Pat. No. 6,344,818, U.S. Pat. No. 6,342,696, U.S. Pat. No. 6,218,830, U.S. Pat. No. 5,790,685, U.S. Pat. No. 5,680,103, U.S. Pat. No. 5,341,126, WO03/032 011, US-2001 0 042 412, WO98/12 573, WO97/50 000, WO97/42 527, EP-0 740 822, EP-0 490 921, WO91/03 746, U.S. Pat. No. 5,121,105, WO88/07 733, US-2003 0 142 853, US-2003 0 128 150, U.S. Pat. No. 6,507,309, U.S. Pat. No. 6,507,278, US-2002 0 130 804, U.S. Pat. No. 6,359,582, U.S. Pat. No. 6,150,810, U.S. Pat. No. 6,133,829, U.S. Pat. No. 5,726,628, U.S. Pat. No. 5,600,303, U.S. Pat. No. 5,692,029, U.S. Pat. No. 5,689,184, U.S. Pat. No. 5,227,800, U.S. Pat. No. 5,073,782, U.S. Pat. No. 5,039,981, U.S. Pat. No. 4,866,439, U.S. Pat. No. 4,866,424, U.S. Pat. No. 4,263,551, U.S. Pat. No. 4,019,053, U.S. Pat. No. 4,012,690, U.S. Pat. No. 3,971,983, U.S. Pat. No. 3,707,672, U.S. Pat. No. 4,987,767, U.S. Pat. No. 5,109,691, U.S. Pat. No. 4,449,115.

More precisely, it is found nowadays that people attempting to remove objects fraudulently from a protected zone, e.g. a thief stealing from a store or a business, or people attempting to introduce prohibited objects, e.g. a school child attempting to introduce an object into a school, are making ever-increasing use of shoes and/or socks for hiding the objects in question.

This phenomenon seems to be due essentially to the fact that this zone of the human body is not easy to inspect visually or by touch.

Furthermore, experience shows that known conventional devices generally give rise to higher alarm rates at shoe level than when acting on the remainder of the human body, apparently because of the almost universal presence of metal reinforcement in the narrow or "shank" part of the soles of shoes.

Attempts have indeed been made to develop detectors that are specifically dedicated to detecting prohibited objects in the shoes of individuals.

Examples of such devices are to be found in documents U.S. Pat. No. 5,039,981 and EP-0 978 734.

However, in practice, none of the devices that have been proposed in the past gives total satisfaction.

Thus, on some sensitive sites it is nowadays necessary to make use of X-ray inspection apparatus, thus requiring people leaving the site or entering the site to remove their shoes, since X-rays devices should not be used directly on shoes that are still being worn because that would lead to exposing parts of the human body to ionizing radiation.

BRIEF SUMMARY OF THE INVENTION

Consequently, an object of the present invention is to provide novel means improving the reliability with which objects are detected in a zone with protected access.

In the ambit of the present invention, this object is achieved by a device which comprises in combination:
 a supporting base designed to receive a single foot wearing a shoe, of an individual to be inspected;
 detector means adapted to detect a target material and associated with the support base; and
 position-identifying means on the support base suitable for imposing accurate positioning of the foot of the individual being inspected relative to the detector means.

Thus, as described in greater detail below, the invention differs from prior art devices known from the above-specified literature and/or from prior practice, by the fact that the device is designed to perform detection on a single foot (shoe) at a time, and thus on two feet (shoes) in succession.

The inventor has determined that the devices proposed in the prior art suffer from a major drawback: they perform detection simultaneously on both feet. Under such conditions, interaction between the materials of objects carried by the two feet or shoes disturb detection.

According to an advantageous characteristic of the present invention, the supporting base comprises a block in the form of a step with the position-identifying means on its top surface.

These position-identifying means preferably comprise a drawing of a footprint within an authorized boundary, combined with a mechanical abutment for the heel of the shoe.

According to other advantageous characteristics of the invention:
 the device includes means which deliver visual or audible messages guiding the user during the successive steps of performing detection (putting one foot into place, detection proper, removing the first foot and repeating with the other foot);
 the device includes means for randomly drawing lots for randomly designating which individuals should undergo one or more additional tests; and
 the device includes means for picking up vapors or traces of particles, e.g. drugs or explosives, and analyzing said vapors or traces.

On this point, it is being found more and or crucial to detect early any attempt at introducing drugs into premises such as schools or universities.

BRIEF DESCRIPTION OF THE DRAWINGS

Other characteristics, objects, and advantages of the present invention appear on reading the following detailed description and from the accompanying drawings given as non-limiting examples, and in which.

DETAILED DESCRIPTION OF THE INVENTION

Figure 1:
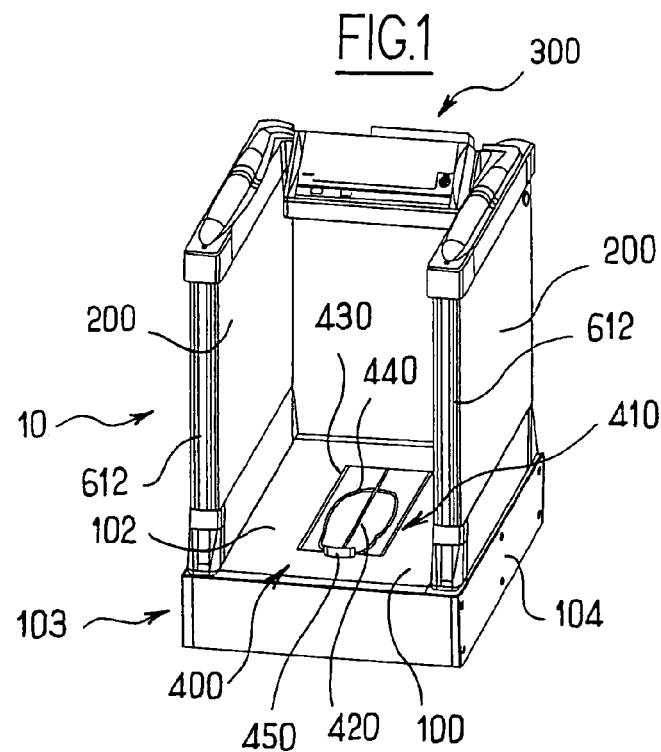
FIG. 1 is a diagrammatic perspective view of a stand of a device in accordance with the present invention.
Figure 2:
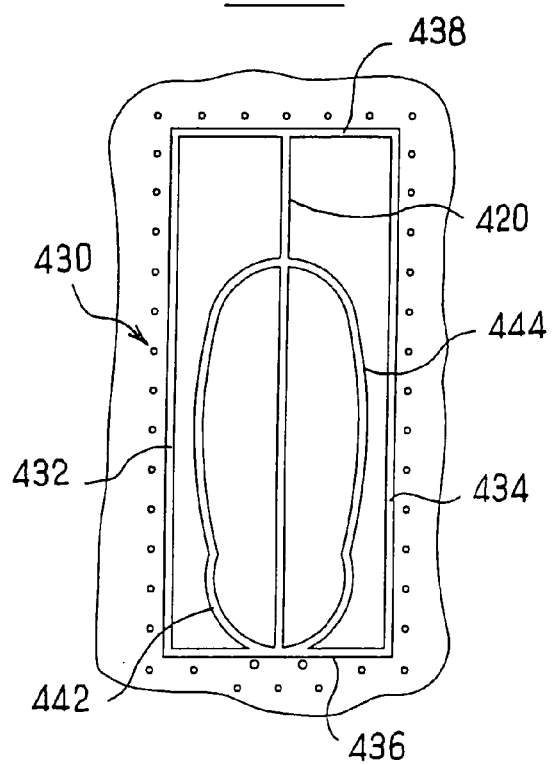
FIG. 2 is a plan view of a preferred embodiment of position-identifying means proposed in the context of the present invention.

The description begins with the general structure of the stand of appliances in accordance with the present invention and shown in the accompanying figures.

The stand 10 preferably comprises:
a supporting base 100;
two symmetrical side panels 200; and
an information module 300.

The supporting base 100 is in the shape of a rectangular slab constituting a step. Its top surface 102 is plane.

The dimensions of the supporting base 100 are preferably as follows:
width lying in the range 450 millimeters (mm) to 700 mm, typically being about 575 mm;
depth lying in the range 500 mm to 9.00 mm, typically being about 670 mm; and
height lying in the range 100 mm, typically being about 150 mm.

The overall outline of the two vertical side panels 200 is rectangular. They are plane and parallel to each other. The two panels 200 project upwards from the base 100 in positions adjacent to its sides 103 and 104. The two side panels 200 in combination with the underlying supporting base 100 thus form a channel suitable for receiving a user's foot wearing a shoe.

The dimensions of the panels 200 are typically as follows:
width corresponding to the depth of the supporting base 100; and
height lying in the range 300 mm to 900 mm, typically being about 690 mm.

The vertical side panels 200 preferably house coils of electrically conductive wire for detecting metals using a conventional method.

The height of the panels 200 and the heights of the coils housed therein are adapted to enable metal objects carried by an individual in a shoe to be detected reliably, and also to detect reliably objects carried at lower leg level, i.e. at the level of the calf up to the knee.

The step-shaped structure proposed for the supporting base 100, typically having a height of about 150 mm, as described above, is designed in such a manner that the person being inspected does not need to climb onto a platform with a risk of falling and of embarrassment as a result of being exposed to other people in the vicinity. Using a supporting base 100 designed for receiving a single foot requires an action that is of the same type as the initial action in starting to climb a ladder, i.e. putting the foot in a well-indicated zone.

Compared with the prior art, such a step structure offers the following advantages:
preparing to climb a step is a normal action undertaken daily and does not require any special instructions for it to be carried out properly;
the same operation does not require physical effort, even for an old person or a pregnant woman, and in particular it does not require significant physical effort of the kind required, for example, for actually mounting onto a platform;
the step-shaped structure enables the antennas that generate and receive electromagnetic fields as constituted by the coils integrated in the side panels 200 to be kept away from the floor, thus reducing any risk of coupling with any metal structures that might be integrated in the floor;
such a structure provides a natural way of examining only one shoe at a time; and
the structure is compact compared with a platform which must be mounted by the entire person, as is required certain known devices in the prior art.

The information module 300 comprises means suitable for delivering visual and/or audible messages for guiding the user during the entire detection process. This module 300 preferably delivers successive messages having the following functions:
indicating that the device is ready to perform detection, e.g. displaying the message "READY";
inviting the individual to place a foot, or shoe, on the footprint marked for this purpose, which footprint is described in greater detail below, for example by displaying a message of the form "PLACE SHOE"; and
informing the individual that detection has been achieved successfully without raising an alarm, and then either inviting the person to repeat the procedure with the other foot, or else to withdraw, e.g. in the form of messages such as "PASSED" and "WITHDRAW".

Naturally, the means 300 preferably also include processor means suitable for making use of the electrical signals coming from the coils housed in the side panels 200.

The detector means placed in the side panels 200 may be constituted by transmitter and receiver coils in any suitable disposition known to the person skilled in the art.

Figure 4:
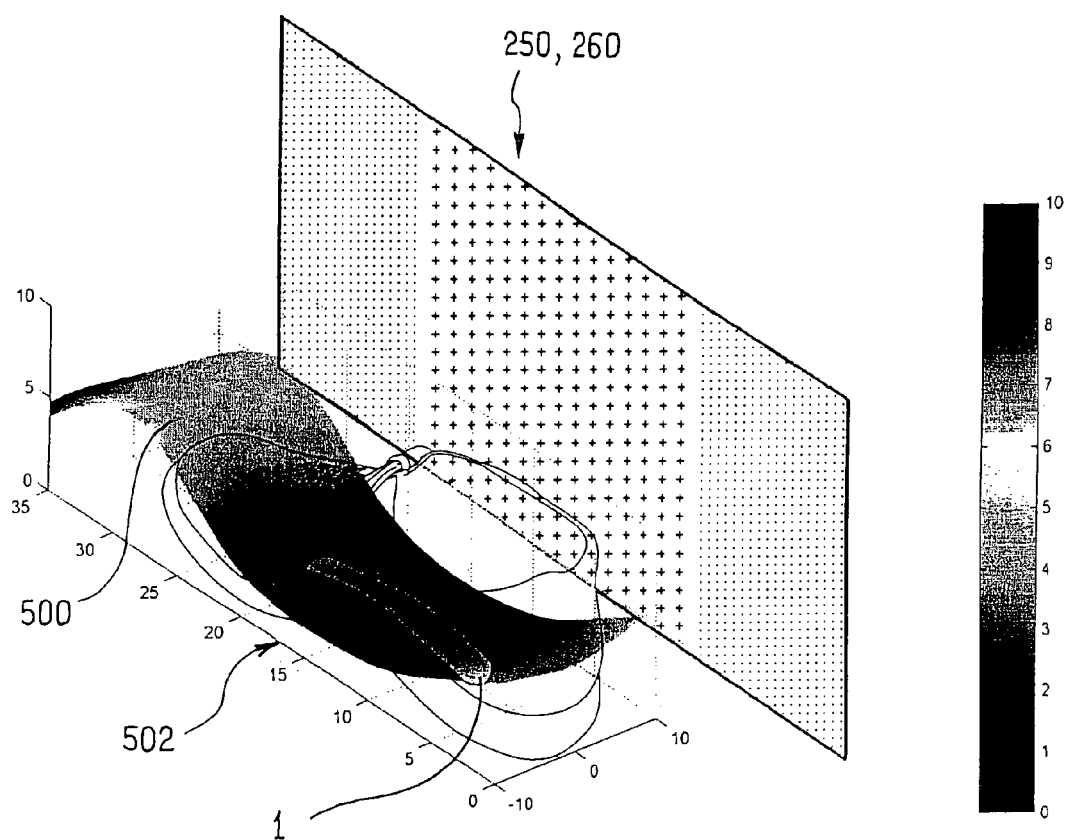
FIG. 4 is a diagram showing the positioning of a shoe relative to the detector coils.

Such coils are shown diagrammatically in FIG. 4.

Since such coil-based detector means are well known to the person skilled in the art, the shape of the coils is not described in greater detail below.

Nevertheless, it is recalled that the coils preferably comprise a plurality of loops connected in series and in opposite directions for canceling out external interfering effects, as shown by way of example in FIG. 4; the device preferably has coils that are offset from one another both for transmission and for reception, and the coils are preferably powered by signals presenting complex harmonic components.

The preferred shape of the means forming the position-identifying marks provided on the top surface 102 of the supporting base 100 in accordance with the present invention are described below.

These position-identifying means are given overall reference 400.

They preferably comprise a drawing 410 combined with an abutment 450.

The drawing 410 itself preferably comprises three elements in combination: a middle line 420, a boundary 430, and a footprint 440.

The middle line 420 extends parallel to the side panels 200 halfway between them. It is centered in the boundary 430 and is preferably of the same length.

The boundary 430 is preferably in the form of a rectangular frame having two mutually parallel long sides 432 and 434, parallel to the middle line 420, and also parallel to the side walls 200, and two mutually parallel short sides 436 and 438 which are perpendicular to the long side 432 and 434 and which interconnect them.

As mentioned above, the long sides 432 and 434 are preferably identical in length and identical to the length of the middle line 420.

The dimensions of the frame 430 are as follows:
width (i.e. the length of the short sides 436, 438) lying in the range 110 mm to 250 mm, and typically about 180 mm; and
length (i.e. the length of the long sides 432, 434) preferably lying in the range 300 mm to 500 mm, and typically being about 400 mm.

The footprint 440 preferably comprises two portions of an ellipse 442, 444 in combination, with their concave sides directed towards each other, the elliptical portions intersecting. The two elliptical portions are of different sizes: a shorter portion 442 is for placing beneath the heel, while a longer portion 444 is for placing beneath the metatarsus. Both elliptical portions 442, 444 are symmetrical about the middle line 420. The outside of the smaller ellipse 442 is adjacent to the short side 436 of the frame 430.

The general dimensions of the footprint 440 as formed in this way are preferably as follows:
length or maximum extent parallel to the middle line 420 lying in the range 250 mm to 350 mm, typically being about 300 mm; and
width, i.e. parallel to the short side 436 and 438 of the frame lying in the range 100 mm to 180 mm and typically being about 136 mm.

The abutment 450 can be implemented in any suitable manner. It is preferably constituted by a slightly curved projection provided in the zone that is common to the short side 436 of the frame and to the rear portion of the footprint 440, so as to serve as a stop for the heel of the shoe.

The positioning footprint 400 may be drawn or in engraved on the top plane 102 of the step 100. The abutment 450 forms a reference in relief serving to ensure that the heel of the shoe is in a particular position, and thus ensuring that shoes are repeatably positioned accurately relative to the coils integrated in the side panels 200. The inventor has found that such accurate and repeatable positioning is essential for analysis to be reliable, with maximum rejection of those metal parts that are normally to be found in shoes (in the shank or the heel).

The use of panels 200 placed vertically and containing the antennas for generating and receiving the field, similar in general concept to a conventional metal detector frame provides the following advantages.

Firstly, it should be observed that such vertical panels 200 enable the antennas to occupy heights that guarantee a useful and uniform signal even if the objects to be detected, weapons or similar prohibited objects, provide very small signals and are positioned at ankle height or above the ankle.

In contrast, coils occupying a horizontal plane, as in certain prior art dispositions, for example in the support plane of a platform, do not provide his option, since interception sensitivity tapers off quickly with increasing distance from the coils.

Secondly, it should be observed that in the invention the vertical panels are positioned at a small distance from each other (preferably lying in the range 450 mm to 700 mm, and typical about 575 mm) adjusted in such a manner as to obtain simultaneously a good detection signal from the objects being searched for and a degree of tolerance to variations in the transverse position of the shoe under examination.

Finally, and thirdly, it should be observed that using coils and panels that are vertical, rather than using coils that are horizontal, also makes it possible to achieve a large amount of decoupling relative to any metal masses present in the floor. Thus, so far as the device is concerned, detection behavior is obtained that is constant and independent of the site at which it is installed.

According to an advantageous characteristic of the invention, the coils for generating and receiving the electromagnetic field are positioned so that the detection magnetic field is shaped optimally relative to those zones of shoes that usually present a large quantity of metal. Still more precisely, the coils are thus preferably positioned as a function of the zone in which the horizontal metal reinforcing blade is conventionally positioned in the sole of a shoe. This solution makes it possible simultaneously to intercept fraudulent objects that give rise to a minimum amount of signal anywhere in the volume under search, while also obtaining maximum possible discrimination relative to the metal parts that are normally present in shoes, in particular in shoes of large dimensions.

In FIG. 4, under reference 500, there can be seen the sensitivity curve of the receiver and transmitter coils 250 and 260 that are shown diagrammatically in FIG. 4. As mentioned above, it can be seen that the detection magnetic field is advantageously shaped at 502 on the position of the metal reinforcing element referenced 1 provided in the sole of the shoe and more particularly in its "shank".

Still more precisely in the context of the present invention, the detection magnetic field is advantageously shaped at a distance lying in the range 10 centimeters (cm) to 20 cm from the abutment 450, and typically at a distance of about 15 cm from the abutment.

Figure 5:
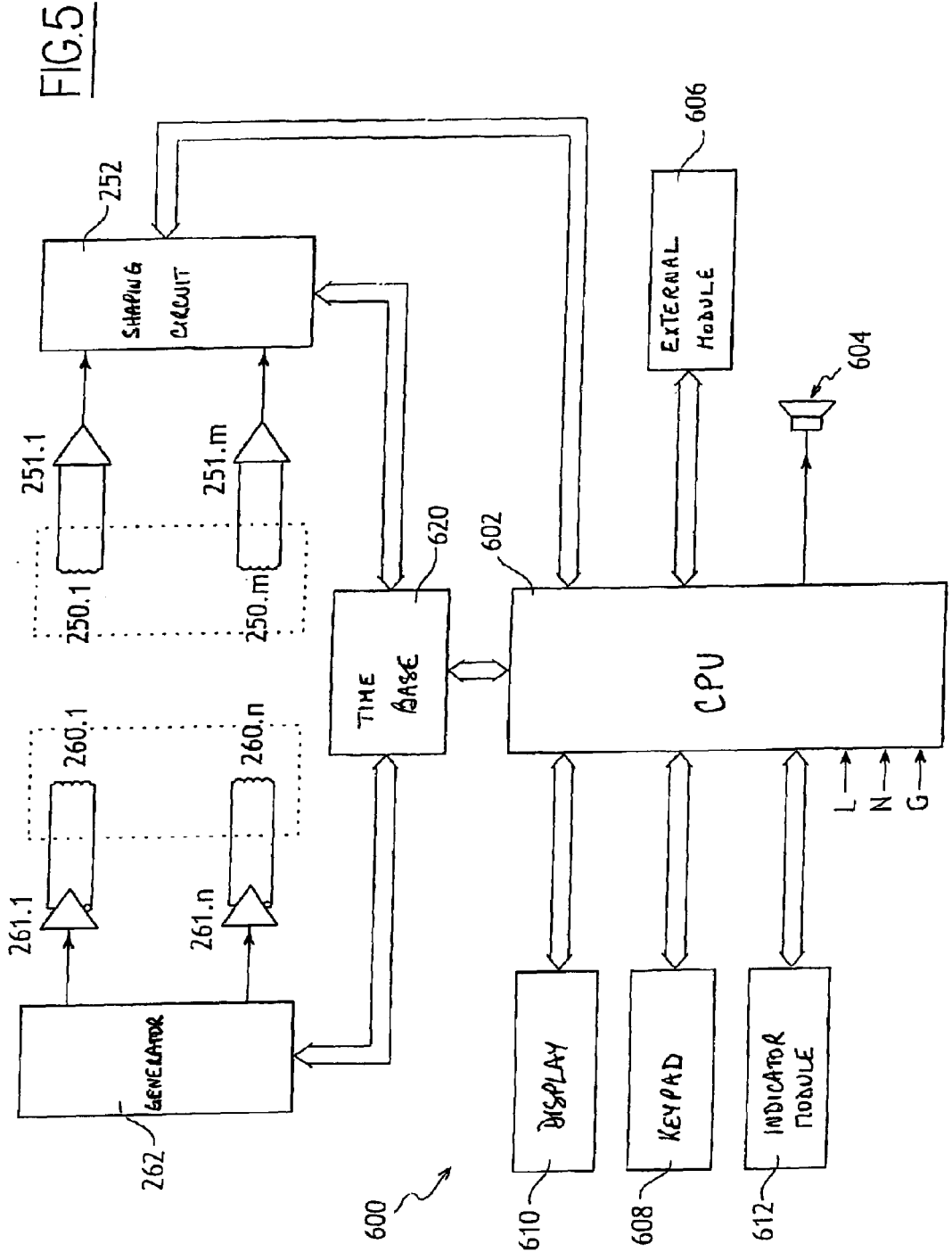
FIG. 5 is a block diagram summarizing the operation of a device in accordance with a preferred embodiment of the present invention.

There follows a description of the structure of the information and processor means shown in FIG. 5. These means have overall reference 600 and they are preferably integrated in the module 300.

In accompanying FIG. 5, there can be seen a central processor unit (CPU) 602 including means for storing the necessary programs and processor means suitable for managing all of the interfaces and making use of the signals that are picked up.

The CPU 602 communicates with:
means 604 for generating an audible alarm signal or voice messages;
means 606 providing a connection with an external module, e.g. an interface of the RS232 type;
means 608 for inputting data, e.g. a keypad;
a module 610 for displaying alphanumeric characters, for delivering the above-described visible signals for guidance purposes, and preferably;
a module 612 for indicating the height of the zone in which a prohibited object has been detected.

The display means 612 are preferably in the form of two display strips disposed on the front vertical edges of the side panels 200, as can be seen in FIG. 1. Each of these strips 612 is subdivided into a plurality of point display devices that are powered selectively when a determined object is detected, at the height at which detection has occurred.

The provision of such information enables external parties to be immediately aware of the height at which an object has been detected on the individual being inspected, and this enables action to be taken quickly.

The CPU 602 shown in accompanying FIG. 5 is also in communication with a time base 620 which controls both the supply of power to the transmitting coils and also, synchronously therewith, the detection of signals coming from the receiver coils.

In FIG. 5, references 260.1, 260.$n$ designate independent transmitter coils powered by respective driver circuits 261.1, 261.$n$, themselves connected to an excitation signal generator 262 driven by the time base 620. FIG. 5 also uses references 250.1, 250.$m$ to designate independent receiver coils connected to respective amplifier circuits 251.1, 251.$m$ connected to a circuit 252 for shaping the received signals coming from the amplifiers 251.1, 251.$m$. The circuit 252 is clocked by the time base 260 and it is connected to the CPU 602.

Naturally, the number of transmitter coils 260 and the number of receiver coils 250 is not restricted to two. Furthermore, the number of transmitter coils 260 is not necessarily identical to the number of receiver coils 250.

The operation of such a circuit is itself known to the person skilled in the art and is therefore not described in greater detail below.

Figure 6:
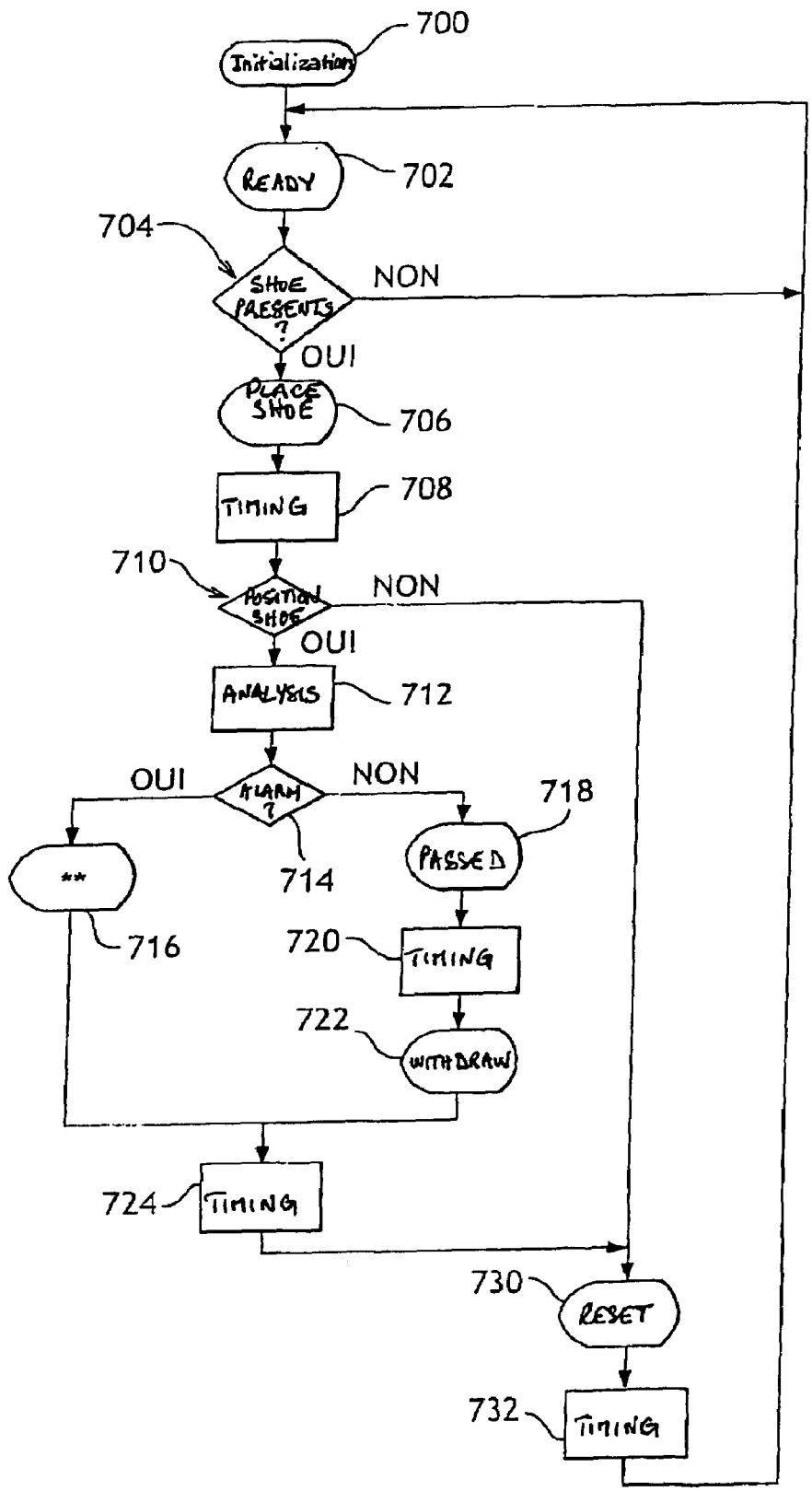
FIG. 6 is a flow chart showing the operation of the device.

With reference to FIG. 6, there follows a description of the general flow chart for operation of such a device.

In FIG. 6, step 700 is an initialization step.

Step 702 is a step of displaying a signal, for example "READY" indicating that the appliance is ready to make a measurement.

In step 704, the CPU 602 uses any appropriate processing (based on the signals coming from the receiver coils 250 or the signal from an auxiliary detector, e.g. an optical detector) to examine whether a shoe is present in the detection field.

If not, step 702 is repeated.

On the contrary, if a shoe is present, step 704 is followed by step 706 during which the CPU 602 causes the display device 610 to display information inviting the individual being inspected to place a shoe on the footprint 400, e.g. by displaying the message "PLACE SHOE".

Following step 708 is a timing step allowing the individual time to place the shoe properly on the footprint 400 or to withdraw the shoe, following an earlier inspection. During following step 710, the CPU examines whether a shoe is properly positioned on the footprint 400.

If not, step 710 is followed by a step 730 of resetting the device and displaying a corresponding signal on the display 610, e.g. "RESET".

Otherwise, if the shoe is properly positioned, step 710 is followed by a step 712 during which the CPU 602 performs analysis proper of the signals coming from the receiver coils 250.

After this step 712, the CPU 602 proceeds during a step 714 with analysis of the result of processing the signals to determine whether or not this should lead to an alarm.

If so, step 714 is followed by a step 716 during which a sound signal is emitted via the means 604 and/or a suitable visible signal is emitted by the display 610.

Otherwise, if there is no alarm, step 714 is followed by a step 718 indicating to the individual being inspected and to the inspection personnel that no fraudulent object has been detected, e.g. by displaying a signal "PASSED".

This display step 718 is followed by a timing step 720 and then by a step 722 during which the CPU 602 causes the display 610 to display a message inviting the individual under inspection to withdraw the shoe, for example in the form of a signal "WITHDRAW".

Steps 716 and 722 are followed by a timing step 724 to allow the individual being inspected to withdraw the shoe appropriately.

Step 724 is followed by above-described step 730.

This step is itself followed by a timing step 732 or allowing the signal to stabilize. Thereafter, step 732 loops back to above-described display step 702.

As mentioned above, the device in accordance with the present invention preferably includes means for randomly drawing lots to designate individuals randomly for undergoing one or more additional tests. By way of example, the additional test(s) may consist in manual palpation or in automatic analysis apparatus, e.g. for picking up and analyzing vapor or traces of particles, e.g. of drugs or explosives.

Figure 7:
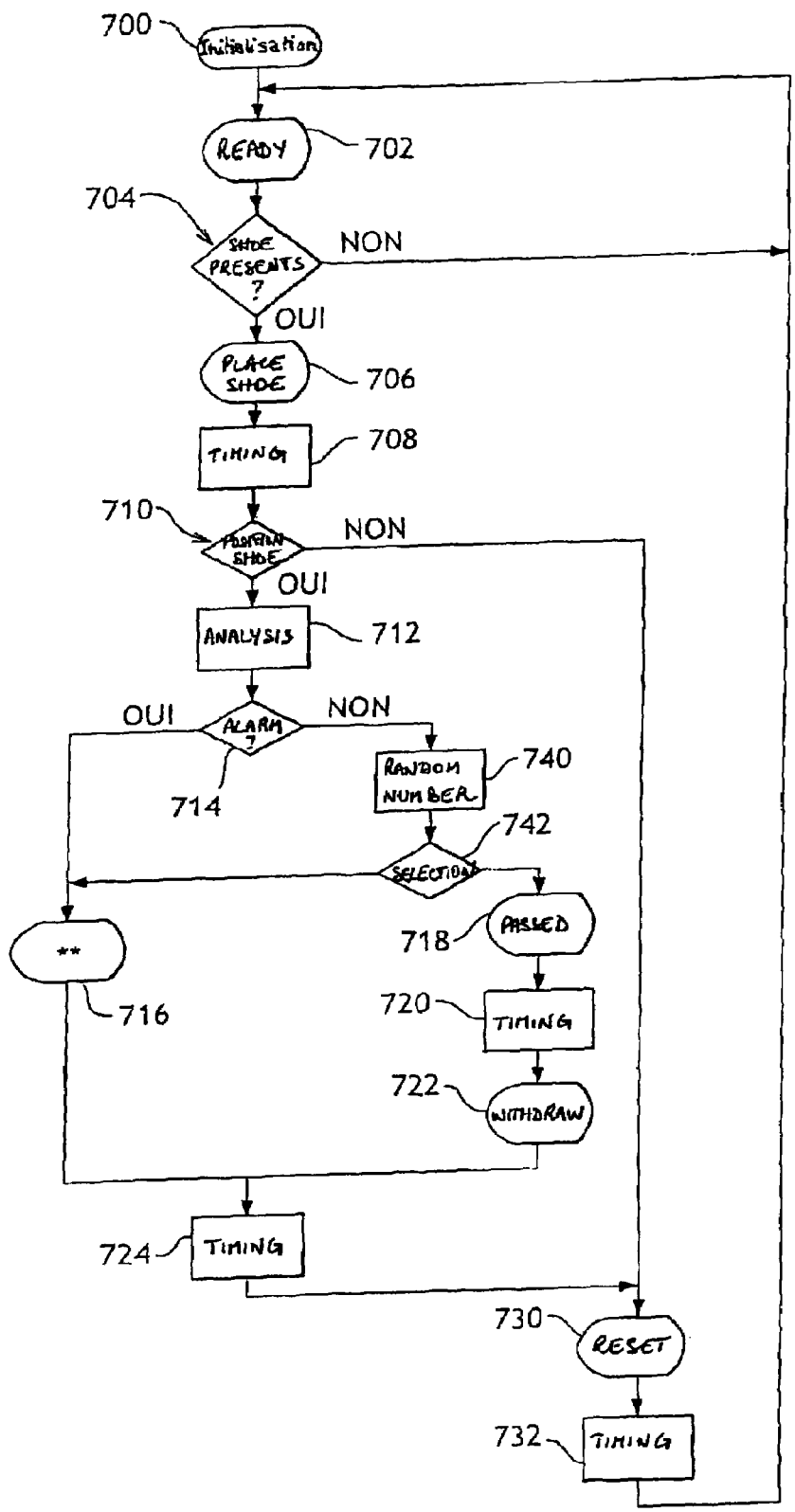
FIG. 7 is a flow chart in accordance with a variant embodiment of the present invention that includes a step of randomly drawing lots for directing individuals to one or more additional tests.

The flow chart describing the operation of such a device including random drawing of lots is shown in FIG. 7.

This figure shows all of the steps described above with reference to FIG. 6. They are therefore not described again. Nevertheless, it should be observed that the flow chart shown in FIG. 7 is specific to a device that includes means for randomly drawing lots for designation purposes and further comprises two additional steps 740 and 742 interposed between steps 714 and display steps 716 and 718.

If an alarm is detected in step 714, that is always followed by display step 716.

Figure 3:
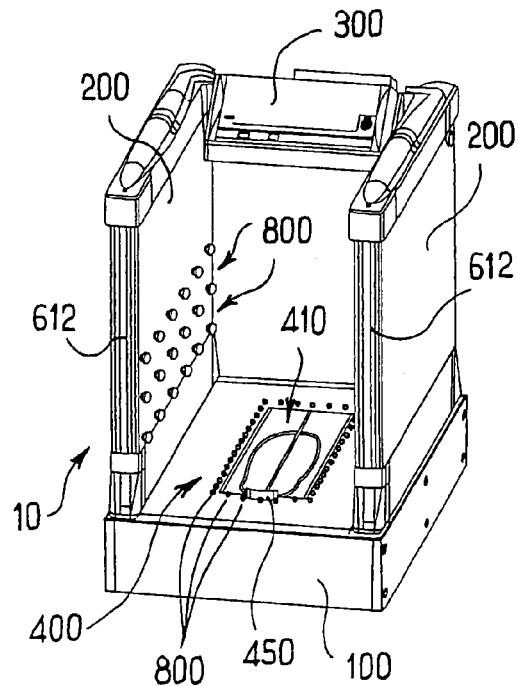
FIG. 3 is a perspective view of a variant embodiment of a stand in accordance with the present invention and fitted with means for detecting vapor or traces of particles.

However, if no alarm is detected in step 714, it is followed by the step 740 in which a random number is drawn. Then, in step 742, the CPU 602 determines whether or not the individual who is being inspected has been selected randomly. If so, step 742 is followed by display step 716. Otherwise, step 742 is followed by the display step that leads to authorization 716. As mentioned above, the device in accordance with the present invention can be associated with means for sucking in vapor and/or traces of prohibited material, e.g. drugs or explosives that might come from the shoes. Such suction intake means are preferably integrated in the side panels 200 and in the step-forming supporting base 100. Thus, FIG. 3 shows a variant embodiment of the device in which the side panels 200 and the supporting base 100 include a plurality of suction nozzles 800.

Figure 8:
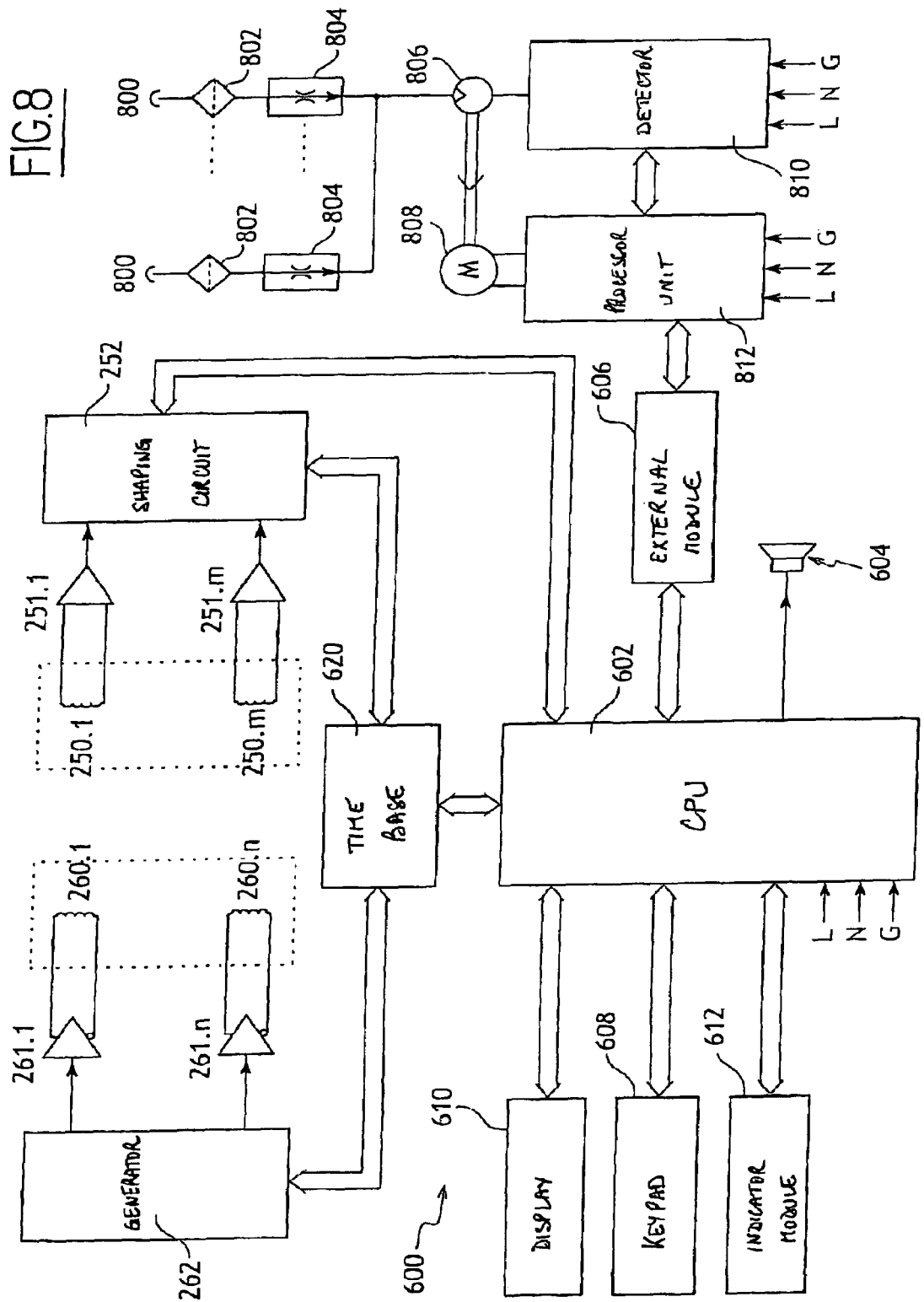
FIG. 8 is a block diagram of a device in accordance with a variant of the present invention having means for picking up and analyzing vapor or traces of particles of material.

Accompanying FIG. 8 shows the structure of a complete device in accordance with the present invention integrating such sample-taking means and the associated processing means. As can be seen in FIG. 8, the nozzles 800 are preferably followed by filters 802 and flow control means 804. These flow control means are themselves connected to the inlet of a pump 806 actuated by a motor 808. The outlet from the pump 806 is connected to a suitable detector 810, for example of the mass spectrometer type. The detector 810 and the motor 808 are connected to and driven by a processor unit 812, itself connected to the CPU 602, e.g. via the interface 606 and any appropriate means.

Otherwise, the means shown in FIG. 8 are the same as those described above with reference to FIG. 5. They are not described in greater detail below.

Figure 9:
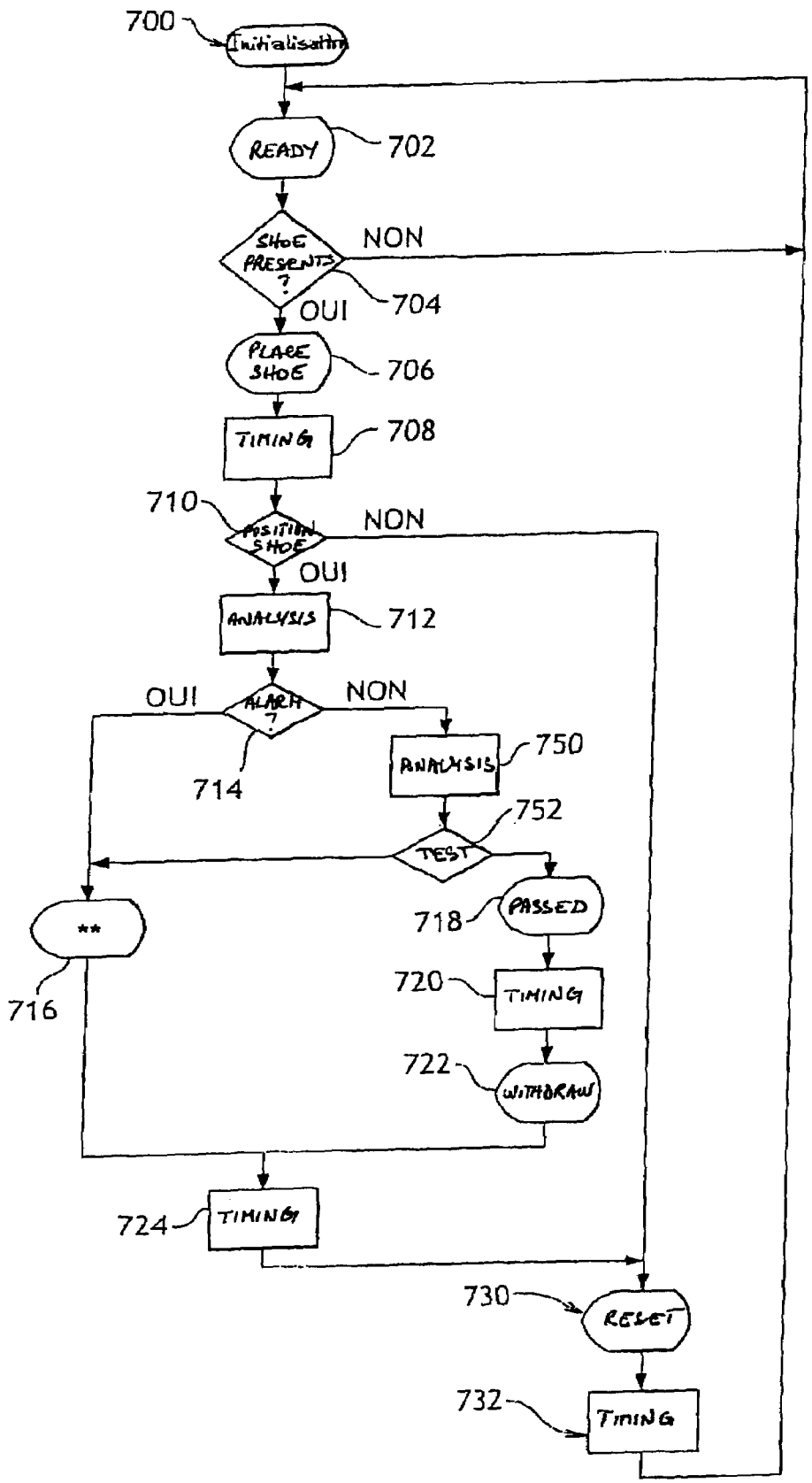
FIG. 9 is a flow chart showing the operation of the device.

A flow chart showing the operation of such a device can be seen in FIG. 9. There can be seen steps that are similar to those described above with reference to FIG. 6 for the base structure, together with two steps 750 and 752 which are interposed between the alarm detection step 714 in which a metal object is detected, and the display steps 716 or 718. Step 750 which follows step 714 in the event of no metal object being detected corresponds to the step of taking and analyzing vapors and/or traces of looked-for materials, e.g. drugs. Step 752 is followed by a test step. If such a substance is detected, this step is followed by the above-described alarm display step 716. Otherwise, if no prohibited substance is detected, the test step 752 is followed by a step of displaying an authorization signal in step 718.

The above-mentioned analysis system 810 can be placed in any appropriate location in the device, and preferably inside the supporting base 100.

In a variant embodiment, the nozzles 800 may be replaced directly by specialized monolithic sensors that are electrically connected to the processor unit 812.

Compared with the prior art, the present invention offers the following advantages in particular:

- high and uniform security level for the inspection;
- very fluid passage without requiring specialized inspection personnel;
- elimination of the costs of specialized personnel dedicated in known applications to inspecting shoes manually;
- increasing comfort to the public by eliminating the difficulties caused by removing shoes and putting them back on again and by the waste of time associated with such an operation;
- eliminating the need for X-ray appliances that are required in certain known applications for inspection purposes;
- the device is lightweight and compact and is therefore easy to move and adapt to any site;
- shoes are not analyzed in differential mode as is the case in certain known appliances, but in absolute manner shoe by shoe. Each shoe is thus evaluated separately and detection of the most critical metal target, i.e. the target that delivers the minimum detectable signal, is performed independently of any comparison with the other shoe. The inventor has found that this disposition makes it possible to guarantee that minimum-signal targets are intercepted safely under all transport conditions even though the total quantity of metal present in a single shoe is often greater than the weight of the minimum-signal metal target;
- shoe analysis is not limited to the bottom portions thereof, or to the portions immediately adjacent thereto, but by using a measuring magnetic field that is highly uniform and structured, it also covers the leg at calf height without any variation in sensitivity and thus without any degradation in the services provided. This guarantees safety even when minimum-signal targets are being carried at ankle level or above the ankle;
- the system in accordance with the invention for investigating shoes under examination and for performing the associated analysis make it possible to detect critical, minimum-signal targets while simultaneously distinguishing them from parasitic signals due to the numerous metal masses present in shoes, and even masses of weight greater than that of the target to be detected. Consequently, the attention of operators specialized in inspection is focused on a limited number of cases, with the corresponding advantages for safety;
- metal structures buried or present in the floor on which the device is standing have little or no influence, with this applying, for example, to the reinforcement in a reinforced concrete floor or to metal plates that are often buried a few centimeters beneath the surface of the floor. This is achieved by a high degree of decoupling relative to such metal masses;
- ergonomically, the appliance is simple and comfortable. It does not require the person being inspected to behave in unusual ways or to take up embarrassing positions. The time required for analysis can be minimized; and
- the use of a supporting base in the form of a step (associated with position-identifying means) guarantees detection on a single shoe, with the other shoe standing on the ground being kept outside the detection field.

Naturally, the present invention is not limited to the particular embodiments described above, but extends to any variant within the spirit of the invention.

Nor is the invention limited to a particular application, and it can be used in any sensitive zone such as a school, a station, a private or public undertaking, a stadium, a concert hall, a demonstration, etc. . . .

In a variant embodiment, the heel abutment 450 can be omitted. However, under such circumstances, it is then preferable to provide a plurality of coils that are offset longitudinally, i.e. parallel to the middle line 420 so as to optimize detection and so as to retain the weakest signal from the coils in order to escape as well as possible from the influence of the metal masses that are traditionally to be found in a shoe.

The invention claimed is:

1. A device for detecting a non-authorized object in a zone with protected access, the device comprising:
   a supporting base (100) designed to only receive a single foot wearing a shoe on its top portion of an individual to be inspected;
   detector means (250, 260, 800, 810) adapted to detect a target material of the single foot and associated with the support base (100); and position-identifying means (400) on the support base (100) suitable for imposing accurate positioning of the single foot of the individual being inspected relative to the detector means.

2. A device according to claim 1, characterized by the fact that the supporting base (100) comprises a block in the form of a step with the position-identifying means (400) on its top surface (102).

3. A device according to claim 1, characterized by the fact that the height of the supporting base (100) lies in the range 100 mm to 200 mm, and most preferably is about 150 mm.

4. A device according to claim 1, characterized by the fact that the width of the supporting base (100) lies in the range 450 mm to 700 mm, and most preferably is about 575 mm.

5. A device according to claim 1, characterized by the fact that the step of the supporting base (100) lies in the range 500 mm to 900 mm, and most preferably is about 670 mm.

6. A device according to claim 1, characterized by the fact that the position-identifying means (400) comprise a drawing of a footprint (410).

7. A device according to claim 6, characterized by the fact that the drawing of a footprint (410) includes a preferably rectangular frame.

8. A device according to claim 7, characterized by the fact that the length of the frame lies in the range 300 mm to 500 mm, and is preferably about 400 mm, and the width of the frame lies in the range 110 mm to 250 mm, and is preferably about 180 mm.

9. A device according to claim 6, characterized by the fact that the drawing of a footprint (410) includes a middle line (420).

10. A device according to claim 6, characterized by the fact that the drawing of a footprint (410) includes a footprint (440) built up from two adjacent ellipses (442, 444).

11. A device according to claim 10, characterized by the fact that the length of the footprint (440) lies in the range 250 mm to 350 mm, and is preferably about 300 mm, and its width lies in the range 100 mm to 180 mm.

12. A device according to claim 6, characterized by the fact that the position-identifying means (400) include a mechanical abutment (450).

13. A device according to claim 12, characterized by the fact that the mechanical abutment (450) is adapted to act as an abutment for the heel of a shoe.

14. A device according to claim 1, characterized by the fact that the detector means comprise transmitter coils and receiver coils (250, 250) adapted to detecting metal objects.

15. A device according to claim 1, characterized by the fact that the detection magnetic field is modelled in optimum manner relative to those zones of a shoe that usually present the greatest quantity of metal.

16. A device according to claim 14,
characterized by the fact that the detection field of the detector means (250, 260) is advantageously shaped at a distance from the heel of the shoe that lies in the range 10 cm to 20 cm, and is preferably about 1.5 cm.

17. A device according to claim 14, characterized by the fact that the detection magnetic field of the detector means (250, 250) is advantageously shaped at a distance from a mechanical abutment (450) that lies in the range 10 cm to 20 cm, and preferably is about 15 cm.

18. A device according to claim 1, characterized by the fact that it includes means (300) delivering visible or audible messages guiding the user during the successive detection steps.

19. A device according to claim 1, characterized by the fact that it includes means (740) for randomly drawing lots to designate individuals randomly for undergoing one or more additional tests.

20. A device according to claim 1, characterized by the fact that it includes means (800) for picking up vapors or traces of particles, e.g. of drugs or explosives, and for analyzing said vapors or traces.

21. A device according to claim 20, characterized by the fact that the means for picking up vapors or traces comprise suction nozzles (800) on the supporting base (100).

22. A device according to claim 1, characterized by the fact that it includes two vertical panels (200) projecting from the supporting base (100) and housing transmitter coils (260) and receiver coils (250).

23. A device according to claim 22, characterized by the fact that the vertical planes (200) possesses suction nozzles (800) for picking up vapors or traces of particles.

24. A device according to claim 22, characterized by the fact that the height of the vertical panels (200) is adapted to detecting objects up to knee height on an individual being inspected.

25. A device according to claim 22, characterized by the fact that the height of the vertical panels (200) lies in the range 300 mm to 900 mm.

26. A device according to claim 1, characterized by the fact that it includes a plurality of coils that are offset vertically.

27. A device according to claim 1, characterized by the fact that it includes a plurality of coils that are offset horizontally.

28. A device according to claim 1, characterized by the fact that at least one of the vertical panels includes means (612) for displaying the height at which a prohibited object has been detected.

29. A device for detecting a non-authorized object in a zone with protected access, the device comprising:
a supporting base designed to receive a single foot wearing a shoe, of an individual to be inspected;
detector means adapted to detect a target material and associated with the support base; and
a position-identifying means on the support base suitable for imposing accurate positioning of the foot of the individual being inspected relative to the detector means,
wherein the supporting base comprises a block in the form of a step with the position-identifying means on its top surface, so as to impose that the two feet of an individual be placed respectively at two different levels, one of the two feet being placed on the top of the supporting base.

30. A device for detecting a non-authorized object in a zone with protected access, the device comprising:
a supporting base to receive a single foot wearing a shoe, of an individual to be inspected; the supporting base comprising a block in the form of a step so as to impose that the two feet of an individual be placed respectively at two different levels, one of the two feet of an individual be placed respectively at two different levels, one of the two feet being placed on the top surface of the supporting base,
detector means adapted to detect a target material and associated with the support base;
position-identifying means on the top surface of the support base for imposing accurate positioning of the foot of the individual being inspected relative to the detector means; and
two vertical panels projecting from the supporting base and housing transmitter coils and receiver coils forming said detector means.

* * * * *